US010396440B2

(12) United States Patent
Newman

(10) Patent No.: US 10,396,440 B2
(45) Date of Patent: Aug. 27, 2019

(54) DYNAMIC-RANGE ACTIVE FLAT-TORUS SPLIT-PHASE AGGREGATOR

(71) Applicant: Joshua Hershel Newman, Jerusalem (IL)

(72) Inventor: Joshua Hershel Newman, Jerusalem (IL)

(*) Notice: Subject to any disclaimer, the term of this patent is extended or adjusted under 35 U.S.C. 154(b) by 70 days.

(21) Appl. No.: 15/568,819

(22) PCT Filed: Jun. 19, 2016

(86) PCT No.: PCT/IL2016/050647
§ 371 (c)(1),
(2) Date: Oct. 24, 2017

(87) PCT Pub. No.: WO2016/207879
PCT Pub. Date: Dec. 29, 2016

(65) Prior Publication Data
US 2018/0102587 A1    Apr. 12, 2018

Related U.S. Application Data

(60) Provisional application No. 62/183,361, filed on Jun. 23, 2015.

(51) Int. Cl.
*H02J 50/10* (2016.01)
*H01Q 1/24* (2006.01)
*H04B 5/00* (2006.01)
*H01Q 1/36* (2006.01)

(52) U.S. Cl.
CPC ............ *H01Q 1/248* (2013.01); *H01Q 1/36* (2013.01); *H02J 50/10* (2016.02); *H04B 5/0037* (2013.01);
(Continued)

(58) Field of Classification Search
CPC . H02J 50/00; H02J 50/10; H02J 50/12; H01F 38/14
See application file for complete search history.

(56) References Cited

U.S. PATENT DOCUMENTS 6,870,457 B2    3/2005    Chen et al.
2013/0300204 A1   11/2013    Partovi
(Continued)

FOREIGN PATENT DOCUMENTS

WO    2013114978    5/2015

OTHER PUBLICATIONS

Arrawatia Mahima et al: "Differential Microstrip Antenna for RF Energy Harvesting", IEEE Transactions on Antennas and Propagation, IEEE Service Center, Piscataway, NJ, US, vol. 63, No. 4, Apr. 1, 2015 (Apr. 1, 2015), pp. 1581-1588.
(Continued)

*Primary Examiner* — Fritz M Fleming
(74) *Attorney, Agent, or Firm* — The Roy Gross Law Firm, LLC; Roy Gross

(57) ABSTRACT

The invention consists of a novel energy harvesting antenna designed to receive radiation at frequencies of interest at high levels of efficiency and efficacy, and high power density. The antenna comprises what may be thought of as a flattened figure-eight (topologically a flattened-torus) comprising two or more overlapping conductive coils covered with and separated by thin, high-dielectric polymer materials. The two outputs of the device are connected to two points of the antenna that are at largely opposite points of phase, such that at any given time the voltage at these points (with respect to a ground at the center of the antenna) is of opposite polarity and of a maximal magnitude. The two coils formed by the figure-eight of the antenna will have opposite voltages impressed upon them, as well as additively sum- (Continued)

ming the amperages at the output, due to the geometry of the device. Furthermore, the coils formed are also able to function inductively. Additionally, when the aforementioned overlapping conductive coils are separated by thin, ferroelectric or ferromagnetic polymer materials, Q is increased and the antenna gains further capability to harvest electrostatic and electromagnetic field energy.

6 Claims, 5 Drawing Sheets

(52) U.S. Cl.
CPC ......... *H04B 5/0075* (2013.01); *H04B 5/0081* (2013.01)

(56) References Cited

U.S. PATENT DOCUMENTS

| | | |
|---|---|---|
| 2013/0307468 A1 | 11/2013 | Lee et al. |
| 2014/0091640 A1 | 4/2014 | Scholz et al. |
| 2014/0246922 A1* | 9/2014 | Ichikawa ................ H01F 38/14 307/104 |
| 2015/0028687 A1* | 1/2015 | Ichikawa ................ H01F 38/14 307/104 |
| 2018/0123393 A1* | 5/2018 | Newman ................. H02J 50/10 |

OTHER PUBLICATIONS

European Extended Search Report, Application No. 16813843.6, dated May 7, 2018, 10 pages.
Macrelli, et al., "Design and Fabrication of a 29 μH Bondwire Micro-transformer with LTCC Magnetic Core on Silicon for Energy Harvesting Applications", In 2014 Design, Automation & Test in Europe Conference & Exhibition, IEEE, Mar. 31, 2014.
International Search Report Application No. PCT/IL2016/050647 Completed Oct. 6, 2016; dated Oct. 9, 2016 5 pages.
Written Opinion of the International Searching Authority Application No. PCT/IL2016/050647 dated Oct. 9, 2016 5 pages.

* cited by examiner

DYNAMIC-RANGE ACTIVE FLAT-TORUS SPLIT-PHASE AGGREGATOR

This application is a National Phase of PCT Patent Application No. PCT/IL2016/050647 having International filing date of Jun. 19, 2016, which claims the benefit of priority of U.S. Provisional Application No. 62/183,361 filed on Jun. 23, 2015. The contents of the above applications are all incorporated by reference as if fully set forth herein in their entirety.

FIELD OF THE INVENTION

The present invention relates generally to the field of wireless energy harvesting devices. More specifically, the present invention relates to antennae for wireless energy harvesting devices.

BACKGROUND OF THE INVENTION

The increasing crowding of the electromagnetic spectrum as well as increased power demands of mobile devices both spur interest in wireless energy harvesting.

Typical energy harvesting devices are comprised of an antenna which induces AC current from gathered ambient EM radiation, and an AC-DC converter which converts the AC current to usable DC current. Simple energy harvesting devices have a simple rectifier and an antenna, when combined the devices are called, "rectennas" (rectifier-antenna).

For the purpose of energy harvesting many antenna designs were used and known including: dipole antennas, loop antennas, patch antennas, spiral antennas, slot antennas, etc.

For the purpose of EM energy harvesting devices, antenna designs are created in such a manner as to utilize ambient EM radiation in order to maximize the AC voltage directed to the AC-DC converter. In order to achieve an optimal antenna design for this purpose, designs are created with the following factors in mind: Omni-directionality, compact dimensions, wide bandwidth reception, low resonance frequency point, high efficiency, etc.

There are many difficulties in designing an optimal antenna that maximizes on all of the above factors, mainly due to the fact that often by increasing one factor, may result in decreasing other factors. For example:

In traditional antenna designs, a compact design will often result in low bandwidth (due to short electrical length) impairing the antenna's ability to receive energy from various EM sources that emit varied frequency signals. On the other hand, increasing dimensions to achieve wider bandwidth will result in an antenna that has no utility to many consumers that require a compact EM energy harvesting device to charge mobile devices such as phones, tablets, smart watches, cameras, etc.

Furthermore, using traditional antenna designs, a smaller antenna will become resonant while receiving much higher frequency waves, while ignoring all together lower frequency waves.

Thus, in order to maximize output voltage, the chosen antenna design must maximize frequency bandwidth reception. It is apparent to a person skilled in the art that while there is little difficulty in designing an antenna that collects only SHF radio waves (3-30 GHz), there is a difficulty in designing an antenna that has such high bandwidth that it also may collect waves in the SLF part of the spectrum (30-300 Hz), as well as other usefully energetic parts of the EM spectrum, for example: HF (3-30 MHz), VHF (30-300 MHz), UHF (300-3000 MHz), etc.

For the purpose of collecting HF waves and lower frequency, it is not advisable to use a typical 15 meter long dipole antenna that is required to effectively enable 10 MHz frequency wave exploitation. For this purpose, there is a need for a compact design that is much smaller and compact in order to enable utility in mobile electronics applications.

In addition, such an optimal antenna design must also incorporate superior reception capabilities in exchange for redundant broadcasting capabilities and also incorporating omni-directionality to receive signals from EM sources located in all directions in relation to the harvesting device. A traditional design that increases on such factors is the loop design. Unfortunately, the loop design requires increasing dimensions for lower frequency reception and wider bandwidth.

In addition, an optimal antenna design must become resonant at a lower frequency point in order to enjoy resonance from the collection of common frequency waves. Thus, unlike a simple loop antenna that in order to resonate at a 15 MHz frequency must have a 20 meter perimeter, which is too large for the purpose of mobile applications.

As is well known to one with ordinary skill in the art, an EM transmission consists of the near-field which generally exists within one wavelength of the EM source's frequency and the far-field at distances greater than two wavelengths. Between the near and far-fields (between one and two wavelengths distance from the EM transmission) is found a transition zone, where far-field effects generally dominate. In the far-field, electric and magnetic fields are associated with each other and the ratio of the field intensities are known as the wave impedance, while in the near-field, the electric and magnetic fields can both exist independently and one field may dominate the other.

As is also well known to a person with ordinary skill in the art, a receiving antenna which is "electrically shorter" than ½ wavelength of the EM transmission may be caused to efficiently (by up to orders of magnitude) receive the EM transmission energy and effectively transduce it to AC by two means: inductively (by causing an induced current in an appropriate conductor) for the near-field, and resonantly (by causing the antenna to resonate at the frequency of the EM transmission) for both the near and far-fields.

Furthermore, through techniques which are familiar to one with ordinary skill in the art, such as controlled feedback oscillator loop coupling, with an LC circuit (tuned) it is possible to cause 'regeneration' thereby increasing the amplification factor of up to 15,000 or more.

Additionally, a technique familiar to one with ordinary skill in the art, using a type of antenna utilizing a core made of a material appropriate to frequency or frequencies an antenna is exposed to and desired to receive will extremely enhance the bandwidths of such an antenna, for example the so-called "Ferrite Rod Antenna", used almost always in portable receivers for receiving broadcasts in long, medium and sometimes short wave bands. However, these antennas suffer certain drawbacks, including but not limited to: weight despite compactness, certain losses due to core material losses at certain frequencies, null area(s) due to shape, etc.

In the exemplary embodiments disclosed herein, a novel and non-obvious solution has been found to the aforementioned shortcomings, which gains the benefits of the aforementioned "Ferrite Rod" type antennae as well as other types of "cored" antennae, without the drawbacks, and has been found to additionally increase the Q of said exemplary embodiments disclosed herein significantly, by means of inserting ferromagnetic or ferroelectric polymer layer(s) (or, alternatively, a combination of these materials) between the conductive layers of the exemplary embodiments disclosed herein, depending upon the particular application attributes, for the purpose of effecting enhancement of magnetic or electric field (or any particular combination thereof) reception/harvesting and transduction efficiency.

Combining the aforementioned and following methods with an apparatus as described herein, is not obvious to one skilled in the art and will result in a novel and inventive compact device capable of aggregating wide bandwidths highly efficiently.

Furthermore, there is a need in creating an efficient design that allows exploiting both opposite phases of a wave in the same frequency without suffering destructive interference. Said optimal design will then achieve an output power that is double than the expected power of a regular antenna without the need of using multiple antennas per a harvesting device.

Thus exists a long felt need to achieve a new antenna design for energy harvesting purposes with the following features:
a. Wide bandwidth allowing efficient reception of SLF to SHF EM waves.
b. Superior reception capabilities.
c. Minimal or no antenna radiation/transmission.
d. Low frequency and multi-frequency resonance points.
e. Compact dimensions.
f. Efficient design that allows exploiting both opposite phases of a wave in the same frequency.
g. Optimised design for output AC phase angles closest to zero degrees, in order to maximize real/active power ("P"), as in the equation for AC circuits: $P = V_{RMS} \times I_{RMS} \times \cos\theta$.
h. Ability of antenna to operate both resonantly and inductively, in order to receive both ambient EM transmissions and from near-field induction (such as NFC, for example).
i. Capability to further enhance Q and efficiency as well as exploit more fully electric and magnetic field reception/harvesting (including static electrostatic and magneto-static fields).

SUMMARY OF THE INVENTION

The invention consists of a novel energy harvesting antenna designed to receive radiation at frequencies of interest at high levels of efficiency and efficacy, and high power density, both resonantly and inductively (electrodynamic and electromagnetic, as well as electrostatic and magneto-static field energies).

The energy harvesting antenna of the present invention characterized in: having two or more largely overlapping coils arranged in a largely flat torus shape; said coils measure largely 85 millimeters in length, 50 millimeters in width, arranged as a rectangle with conductive sides largely 7 millimeters wide, with a gap of largely 6 millimeters between the two phase terminals [104-105], and the neutral terminal attached to the center of the coils [107]; the thickness of said conductive overlapping coils measures largely 12 mils (0.31 millimeters) per two overlapping coils;
a) wherein, said conductive parts being covered by and separated by thin polymer high-dielectric laminates, measuring largely 3.5 mils (0.09 millimeter) for external surfaces and 5 mils (0.13 millimeter) between said coils;
b) having a split phase;
c) wherein, the two phases start at two origin points, then largely overlap until converging in a middle grounding point;
d) wherein, EM waves induce AC current in the phases in opposite directions due to the middle positioned grounding point, such that at any given time the voltage at the origin points (with respect to the grounding point) is of opposite polarity and of a maximal magnitude;
e) wherein the compact overlapping torus shape enables wide bandwidth efficient reception, and a resonance point in the HF band of the spectrum, as well as enabling the antenna to operate as an induction coil.
f) Wherein the overlapping conductive layers may be separated by ferroelectric and/or ferromagnetic polymer material layer(s) thereby increasing the Q and efficiency as well as enabling the antenna to operate additionally to harvest electrostatic and magneto-static field energies.

It is within the provision of the invention that the antenna is wrapped by a highly conductive material such as copper tape for improving the antenna's efficiency, thus, increasing AC current output.

It is within the provision of the invention that the antenna is further comprised of up to 2 or more additional layered sets of largely overlapping coils, increasing the AC current created through the antenna. It is within the provision of the invention that the grounding of the antenna is amplified creating a transistor effect that in turn increases the AC current created from the antenna.

It is within the provision of the invention that the antenna further comprises a layer of a thin material characterized in having a high dielectric constant, wherein the thin material is located between the two or more largely overlapping coils.

It is within the provision of the invention that the antenna further comprises a layer of a thin material characterized in having ferromagnetic or ferroelectric properties, wherein the thin material is located between the conductive layers of the two or more largely overlapping coils, enabling increased Q and ability to additionally harvest electrostatic and magneto-static energy fields.

It is within the provision of the invention that the antenna is adapted to serve as an inductor enabling direct charging of electric devices using such means as NFC.

It is within the provision of the invention that the antenna is arranged in a round shape with a diameter of largely 85 millimeter.

As can be seen, the combination of the above design elements of the present invention enables the following advantages:
a) Wide bandwidth allowing efficient reception of SLF to SHF EM waves.
b) Superior reception capabilities.
c) Minimal or no antenna radiation/transmission.
d) Low and multi-frequency resonance points.
e) Compact dimensions.
f) Efficient design that allows exploiting both opposite phases of a wave in the same frequency.
g) Optimised design for output AC phase angles closest to zero degrees, in order to maximize real/active power ("P"), as in the equation for AC circuits: $P = V_{RMS} \times I_{RMS} \times \cos\theta$.
h) Ability of antenna to operate both resonantly and inductively, in order to receive both ambient EM transmissions and from near-field induction (such as NFC, for example).

i) Ability of the antenna to obtain higher Q as well as harvest electrostatic and magneto-static field energy.

It should be mentioned that only by extensive experimentation, the specifications and measurements of the device of the present invention were implemented. It is only through the present specification, that the unique advantages of the present invention may be achieved. The present invention is therefore surprising and not obvious for one skilled in the art.

The foregoing embodiments of the invention have been described and illustrated in conjunction with systems and methods thereof, which are meant to be merely illustrative, and not limiting. Furthermore just as every particular reference may embody particular methods/systems, yet not require such, ultimately such teaching is meant for all expressions notwithstanding the use of particular embodiments.

BRIEF DESCRIPTION OF THE DRAWINGS

Embodiments and features of the present invention are described herein in conjunction with the following drawings.

DETAILED DESCRIPTION OF PREFERRED EMBODIMENTS

The present invention will be understood from the following detailed description of preferred embodiments, which are meant to be descriptive and not limiting. For the sake of brevity, some well-known features, methods, systems, procedures, components, circuits, and so on, are not described in detail.

The invention consists of a novel energy harvesting antenna designed to receive radiation at a wide bandwidth of frequencies that include the cellular radio frequencies (such as the quad-band frequencies 850 Mhz, 900 Mhz, 1800 Mhz, 1900 Mhz, various microprocessor clock frequencies, and other frequencies), as well as function inductively.

Figure 1:
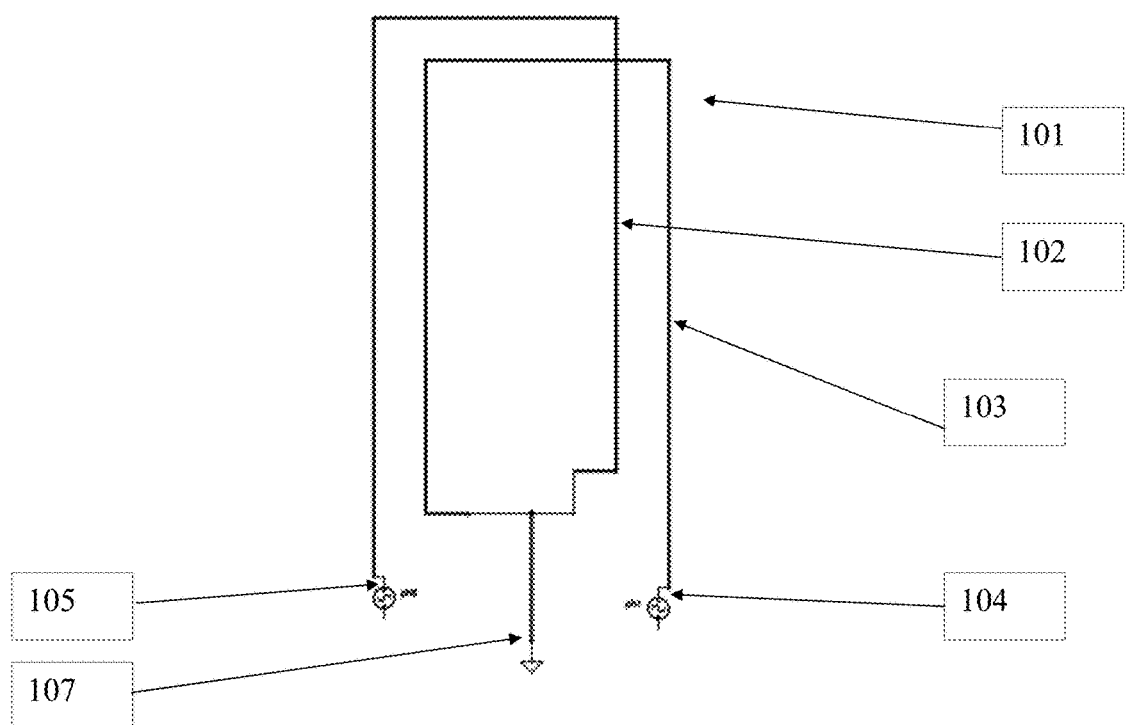
FIG. 1 depicts the geometry of one embodiment of the antenna of the invention.

As seen in FIG. 1, the energy harvesting antenna comprises a flattened torus comprising two largely overlapping flattened coils [102, 103]. The two outputs [104, 105] are connected to two points of the antenna that are at largely opposite points of phase, such that at any given time the voltage at these points (with respect to a ground [107] at the center of the antenna) is of opposite polarity and of a maximal magnitude.

As will be appreciated by one skilled in the art, the two coils formed by the flattened-torus shape of the antenna [101] will have opposite voltages impressed upon them due to the geometry of the device; the flux through coil [102] will be of opposite sign to that through coil [103], and therefore the rate of change thereof will also be opposite. As the voltage impressed upon the coil depends directly upon this rate of change, the voltages at the outputs [105, 104] will be of opposite polarity.

The use of two oppositely wound coils allows for improvements over the prior art. The energy of passing electromagnetic waves is, as detailed above, harvested at both positive and negative points of the waveform at a given moment, as the inputs are located at points of the antenna that are at opposite points of the waveform impressed from passing electromagnetic waves.

This allows for the outputs [104, 105] to be at maximal voltage difference with respect to one another, and also allows for waveforms of opposite polarity to be used with respect to the ground [107].

Further advantages due to the methods and apparatus herein described, include but are not limited to:

Better active/real power due to optimal phase control;

Increased power efficiency due to self-resonant action—the antenna has balanced inductive and capacitive attributes to the described construction and functionality;

The characteristics of the described antenna allow optimal power transformation of the AC prior to rectification;

Optimal for rectification—the split-phases, AC transformed then fed into appropriate rectifier topology results in nearly ripple-less DC;

By means of, but not limited to the above factors, the output and utility of the antenna is increased greatly.

The foregoing description and illustrations of the embodiments of the invention have been presented for the purposes of illustration. It is not intended to be exhaustive or to limit the invention to the above description in any form.

The reference numbers in the claims are not a part of the claims, but rather used for facilitating the reading thereof. These reference numbers should not be interpreted as limiting the claims in any form.

Figure 2:
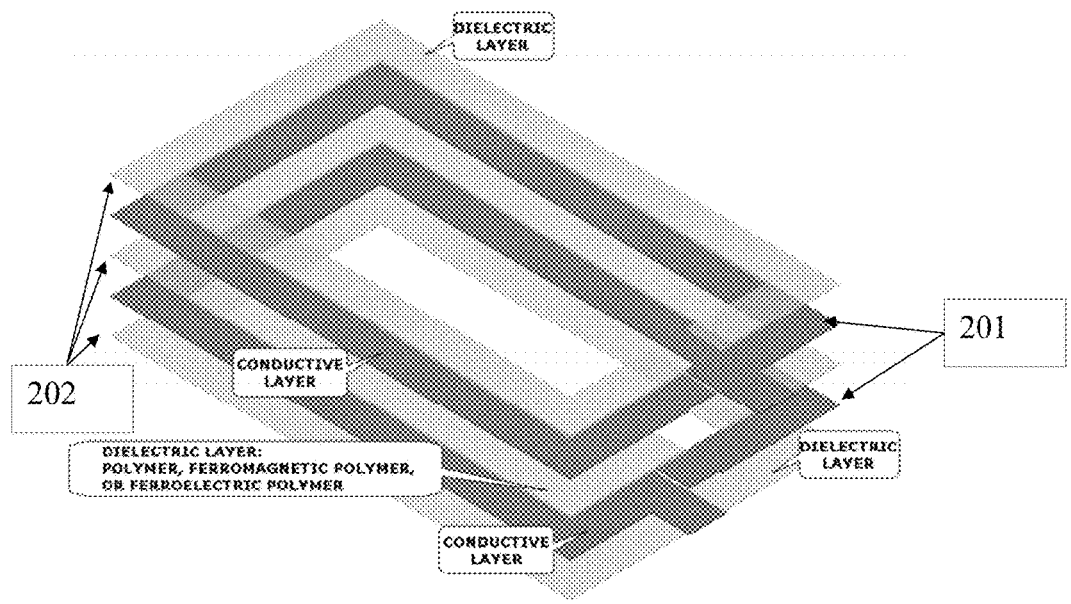
FIG. 2 depicts an embodiment of the present invention with focus to its separate layers.

FIG. 2 depicts an antenna per the present invention. As can be seen, the various conductive 201 and dielectric layers 202 of the antenna are laid each one upon the other.

Figure 3:
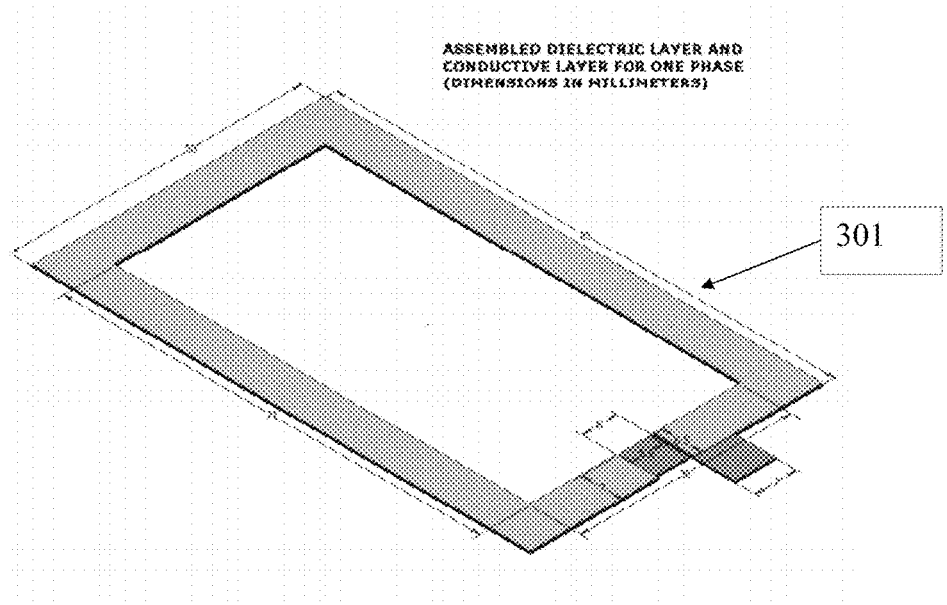
FIG. 3 depicts an assembled device that embodies of the present invention.

FIG. 3 depicts an antenna per the present invention. As can be seen, the various conductive and dielectric layers of the antenna are assembled into a single antenna 301. The specific measurements of this embodiment are also depicted. This embodiment allows for only a single phase connection.

Figure 4:
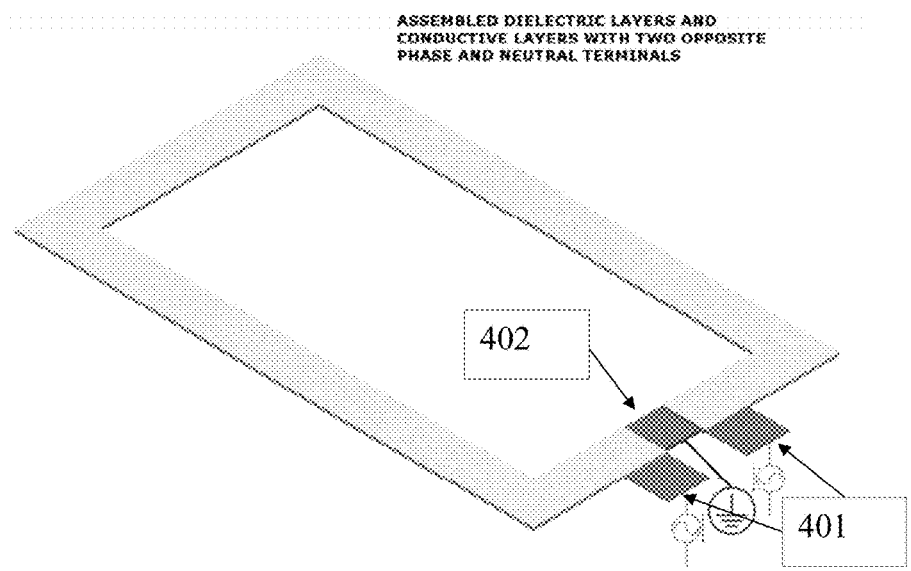
FIG. 4 depicts an assembled device that embodies of the present invention.

FIG. 4 depicts an antenna per the present invention. As can be seen, this antenna has 3 different connections. Two for the opposite phases 401 and one for the neutral grounding point 402.

Figure 5:
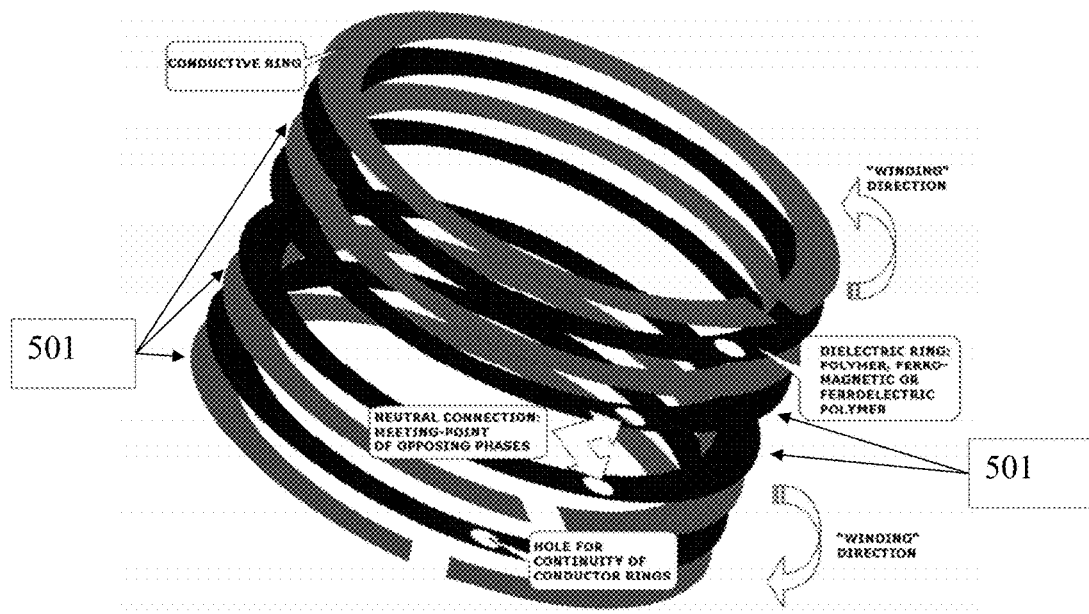
FIG. 5 depicts an embodiment of the present invention with focus to its separate layers.

FIG. 5 depicts the various conductive 501 and dielectric 502 layers of the antenna are laid each one upon the other. The antenna is arranged in a round shape.

Figure 6:
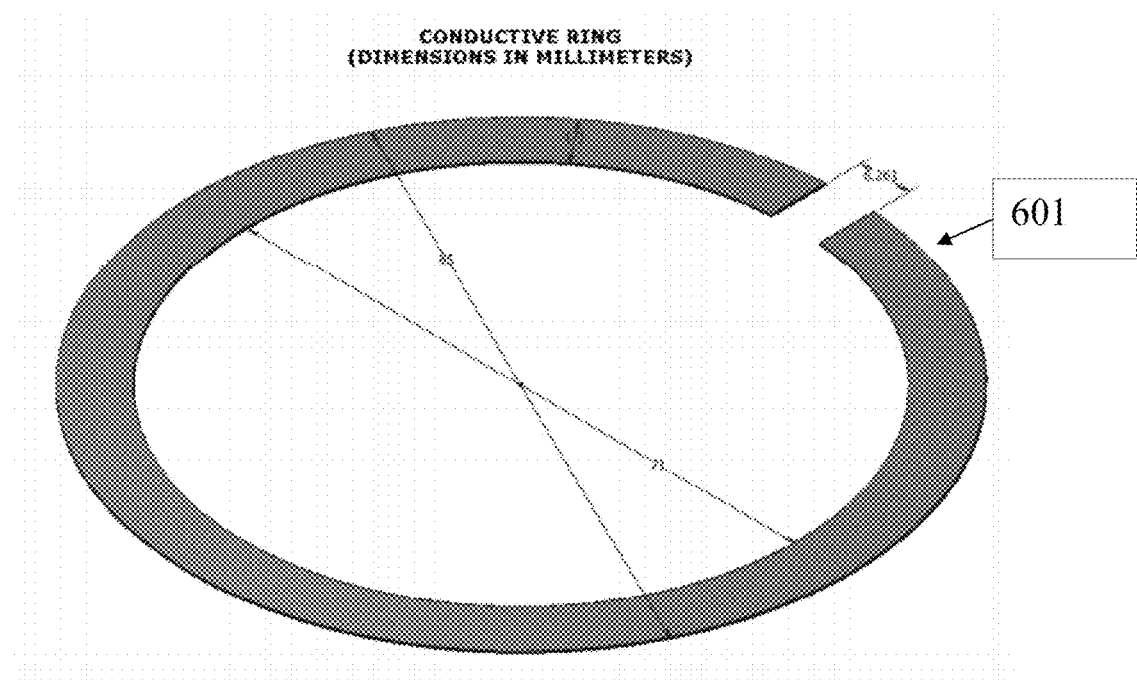
FIG. 6 depicts a conductive layer of a device that embodies the present invention.

FIG. 6 depicts the conductive layer 601 of the antenna is arranged in a round shape. This antenna measures largely 85 millimeters at its diameter.

Figure 7:
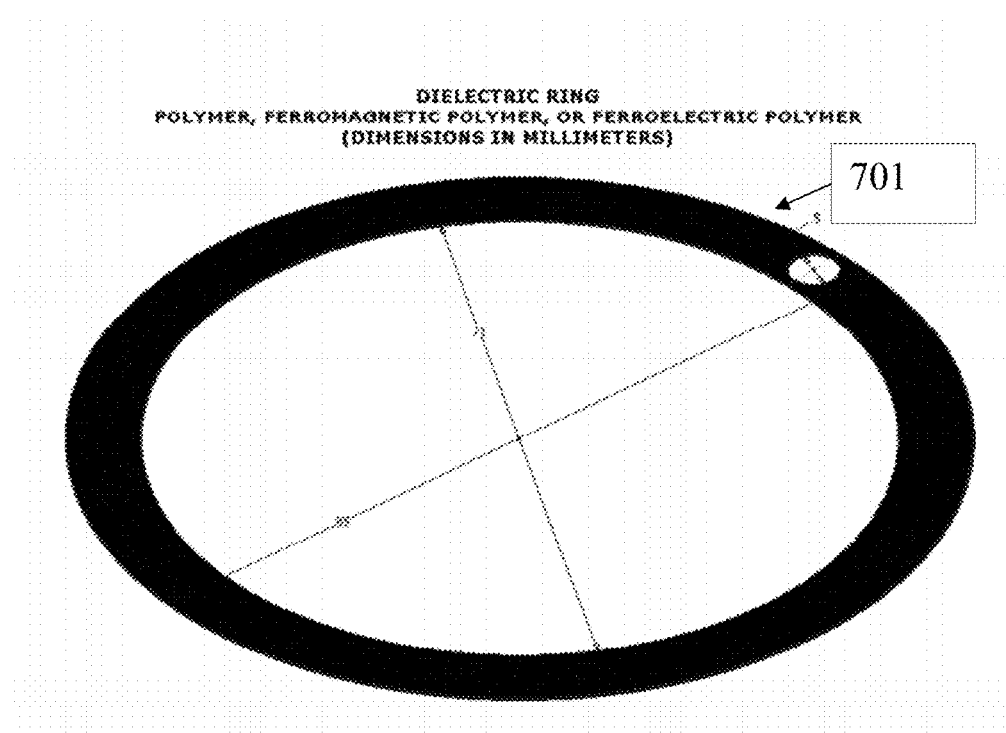
FIG. 7 depicts a dielectric layer of a device that embodies the present invention.

FIG. 7 depicts the dielectric layer 701 of the antenna is arranged in a round shape. This antenna measures largely 85 millimeters at its diameter.

Figure 8:
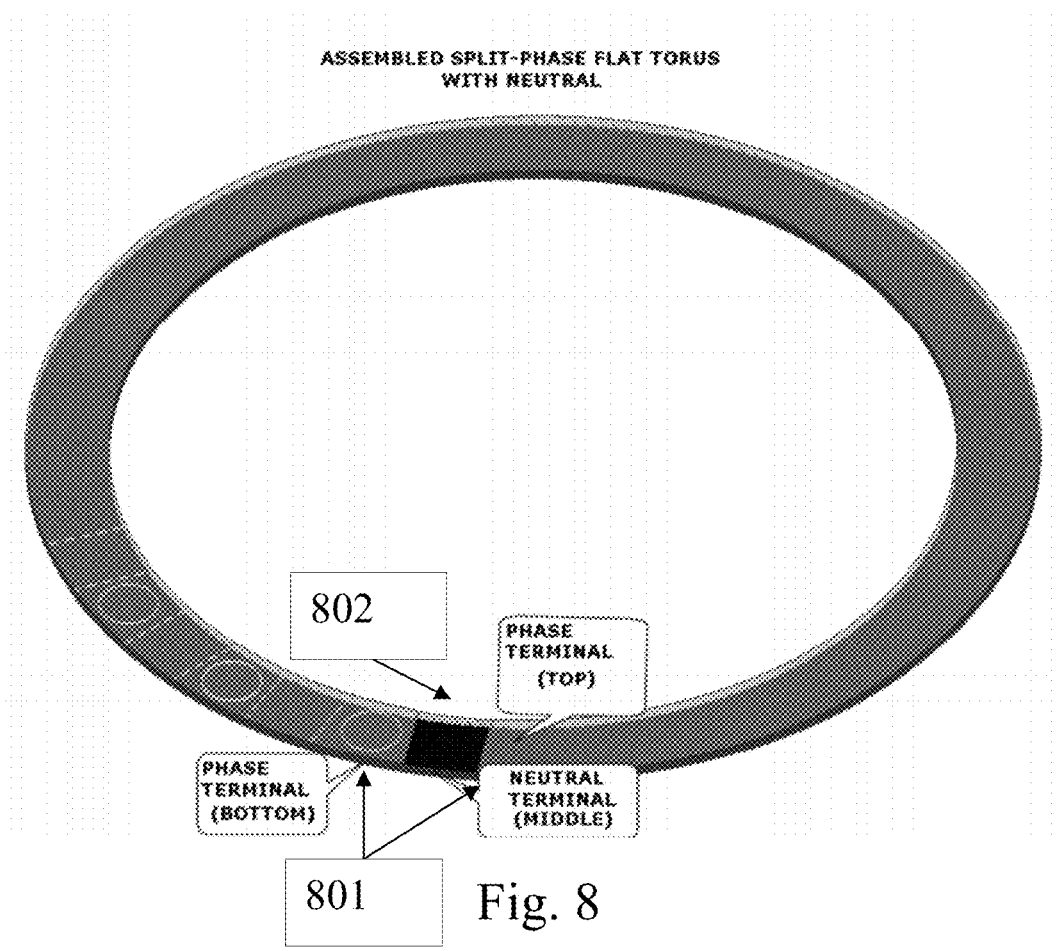
FIG. 8 depicts an assembled device that embodies of the present invention.

FIG. 8 depicts an antenna per the present invention. As can be seen, the various conductive and dielectric layers of the antenna are assembled into a single round shaped antenna. As can be seen, this antenna has 3 different connections. Two for the opposite phases 801 and one for the neutral grounding point 802.

The invention claimed is:

1. An energy harvesting antenna that is characterized in:
   a. having two or more largely overlapping coils arranged in a largely flat torus shape;
   b. said coils measure largely 85 millimeters in length, 50 millimeters in width, arranged as with conductive sides largely 7 millimeters wide with a gap of largely 6 millimeters between two phase terminals [104-105], and a neutral terminal attached to a center of the coils [107]; thickness of said conductive overlapping coils measures largely 0.31 millimeters per two overlapping coils;
   c. wherein, said coils being covered by and separated by thin polymer high-dielectric laminates, measuring largely 0.09 millimeter for external surfaces and 0.13 millimeter between said coils;
   d. having a split phase;
   e. wherein, the two coils start at two origin points, then largely overlap until converging in a middle grounding point;
   wherein, EM waves induce AC current in the split phase in opposite directions due to the middle grounding point, such that at any given time the voltage at the two origin points, with respect to the middle grounding point, is of opposite polarity.

2. The device of claim 1 wherein, the antenna is further comprised of up to 2 or more additional layered sets of largely overlapping coils.

3. The device of claim 1 wherein, grounding of the middle grounding point [107] is amplified creating a transistor effect.

4. The device of claim 1 wherein, the antenna is adapted to serve as an inductor enabling direct charging of electric devices.

5. An energy harvesting antenna that is characterized in:
   a. having two or more largely overlapping coils arranged in a largely flat round torus shape;
   b. said coils measure largely 85 millimeters in diameter, with conductive sides 7 millimeters wide with a gap of largely 6 millimeters between two phase terminals [104-105], and a neutral terminal attached to a center of the coils [107]; thickness of said conductive overlapping coils measures largely 0.31 millimeters per two overlapping coils;
   c. wherein, said coils being covered by and separated by thin polymer high-dielectric laminates, measuring largely 0.09 millimeter for external surfaces and 0.13 millimeter between said coils;
   d. having a split phase;
   e. wherein, the two coils start at two origin points, then largely overlap until converging in a middle grounding point;
   f. wherein, EM waves induce AC current in the coils in opposite directions due to the middle grounding point, such that at any given time the voltage at the two origin points, with respect to the middle grounding point, is of opposite polarity.

6. An energy harvesting antenna that is characterized in:
   a. having at least one coil arranged in a flat torus shape;
   b. said at least one coil measures largely 85 millimeters in length, 50 millimeters in width, with conductive sides largely 7 millimeters wide with a gap of 6 millimeters near a phase terminals, and a neutral terminal attached to a center of said at least one coil;
   c. wherein, said at least one coil being covered by thin polymer high-dielectric laminate, measuring largely 0.09 millimeter for external surfaces;
   d. having a single phase;
   e. wherein, said at least one coil starts at an origin point, then largely overlaps until to a middle grounding point;
   f. wherein, EM waves induce AC current in said at least one coil due to the middle positioned grounding point, such that at any given time there is a voltage at the origin point, with respect to the middle grounding point.

* * * * *